(12) United States Patent
Franke et al.

(10) Patent No.: US 11,080,201 B2
(45) Date of Patent: *Aug. 3, 2021

(54) HYBRID MEMORY ACCESS FREQUENCY

(71) Applicant: International Business Machines Corporation, Armonk, NY (US)

(72) Inventors: Hubertus Franke, Cortlandt Manor, NY (US); Bulent Abali, Tenafly, NJ (US); Damir Anthony Jamsek, Austin, TX (US); Marcio Augusto Silva, Mahopac, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/790,341

(22) Filed: Feb. 13, 2020

(65) Prior Publication Data

US 2020/0183850 A1 Jun. 11, 2020

Related U.S. Application Data

(63) Continuation of application No. 16/042,559, filed on Jul. 23, 2018, now Pat. No. 10,599,576.

(51) Int. Cl.
*G06F 12/00* (2006.01)
*G06F 12/08* (2016.01)
*G06F 13/00* (2006.01)
*G06F 12/0877* (2016.01)
*G06F 12/14* (2006.01)

(52) U.S. Cl.
CPC ...... *G06F 12/0877* (2013.01); *G06F 12/1483* (2013.01); *G06F 2212/30* (2013.01)

(58) Field of Classification Search
CPC ........ G06F 3/061; G06F 3/0619; G06F 3/064; G06F 3/065; G06F 3/0656; G06F 3/067
USPC .......................................................... 711/163
See application file for complete search history.

(56) References Cited

U.S. PATENT DOCUMENTS 7,459,442 B2 12/2008 Burnett et al.
8,307,163 B2 11/2012 Chen et al.
8,352,705 B2 1/2013 Agesen
(Continued)

FOREIGN PATENT DOCUMENTS

WO 2014/209234 A1 12/2014

OTHER PUBLICATIONS

Salkhordeh, et al., "An Operating System level data migration scheme in hybrid DRAM-NVM memory architecture," https://ieeexplore.ieee.org/document/7459442/, Mar. 14-18, 2016, 1 page.
(Continued)

*Primary Examiner* — Mohamed M Gebril
(74) *Attorney, Agent, or Firm* — Amin, Turocy & Watson, LLP

(57) ABSTRACT

Techniques that facilitate hybrid memory access frequency are provided. In one example, a system stores access frequency data for storage class memory and volatile memory in a translation lookaside buffer. The access frequency data is indicative of a frequency of access to the storage class memory and the volatile memory. The system also determines whether to store data in the storage class memory or the volatile memory based on the access frequency data stored in the translation lookaside buffer.

20 Claims, 10 Drawing Sheets

(56) References Cited

U.S. PATENT DOCUMENTS

| | | | | |
|---|---|---|---|---|
| 8,542,898 | B2* | 9/2013 | Bathe | G06T 7/0016 |
| | | | | 382/128 |
| 9,652,405 | B1 | 5/2017 | Shain et al. | |
| 10,248,576 | B2* | 4/2019 | Jin | G06F 12/1054 |
| 10,599,576 | B2* | 3/2020 | Franke | G06F 12/128 |
| 2006/0176479 | A1* | 8/2006 | Laurence | G01N 21/6428 |
| | | | | 356/317 |
| 2011/0299317 | A1* | 12/2011 | Shaeffer | G11C 13/0002 |
| | | | | 365/106 |
| 2012/0072652 | A1 | 3/2012 | Celis et al. | |
| 2012/0155725 | A1* | 6/2012 | Bathe | G01N 21/6408 |
| | | | | 382/128 |
| 2015/0199126 | A1* | 7/2015 | Jayasena | G11C 11/005 |
| | | | | 711/103 |
| 2016/0147985 | A1 | 5/2016 | Bakke et al. | |
| 2017/0277640 | A1 | 9/2017 | Jin et al. | |
| 2019/0138437 | A1* | 5/2019 | Bennett | G06F 3/061 |
| 2019/0279304 | A1* | 9/2019 | Unger | G01K 13/08 |

OTHER PUBLICATIONS link.springer.com, "Efficient Management for Hybrid Memory in Managed Language Runtime," https://link.springer.com/chapter/10.1007/978-3-319-47099-3_3, First Online: Sep. 30, 2016, 6 pages.

Non-Final Office Action received for U.S. Appl. No. 16/042,559, dated Aug. 7, 2019, 27 pages.

List of IBM Patents or Applications Treated as Related.

\* cited by examiner

| TAG 403 | FRAME NUMBER 404 | MODIFY/ ACCESS RIGHT BITS 406 | COUNTER 408 |
|---|---|---|---|
| 0x3A282 | 416 | M / RW | 8943394 |
| 0x63393 | 17 | - / R | 27272 |
| 0xdeadb | 9 | - / RW | 6643334343 |
| ... | ... | ... | ... |
| 0x73636 | 253 | M / RW | 342422 |

FIG. 4

HYBRID MEMORY ACCESS FREQUENCY

BACKGROUND

The subject disclosure relates generally to computer systems, and more specifically, to management of memory. With recent advancement in computer technology, new storage types are emerging such as Storage Class Memory (SCM). SCM is a nonvolatile memory that is random accessible at byte granularity. Often times, it is desirable to implement SCM in a hybrid memory system that includes two different types of memory. However, implementing SCM in a hybrid memory system can lead to memory latency issues and/or other decreases in performance due to differences in access time and/or frequency for the two different types of memory. In one example, Jin et al. (U.S. Patent Publication No. 2017/0277640) discloses "a DRAM/NVM hierarchical heterogeneous memory system with software-hardware cooperative management schemes. In the system, NVM is used as large-capacity main memory, and DRAM is used as a cache to the NVM. Some reserved bits in the data structure of TLB and last-level page table are employed effectively to eliminate hardware costs in the conventional hardware-managed hierarchical memory architecture. The cache management in such a heterogeneous memory system is pushed to the software level." However, management of hybrid memory can be improved.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate hybrid memory access frequency are described.

According to an embodiment, a system can comprise an access frequency component and a memory management component. The access frequency component can store access frequency data for storage class memory and volatile memory in a translation lookaside buffer. The access frequency data can be indicative of a frequency of access to the storage class memory and the volatile memory. The memory management component can determine whether to store data in the storage class memory or the volatile memory based on the access frequency data stored in the translation lookaside buffer. The system can provide various advantages as compared to conventional memory management techniques. In certain embodiments, the system can facilitate improved storage efficiency for memory in a hybrid memory system. In an embodiment, the access frequency component can maintain a counter associated with the access frequency data in a page table entry to provide one or more advantages as compared to conventional memory management techniques such as, for example, facilitating improved storage efficiency for the storage class memory and/or the volatile memory. In another embodiment, the access frequency component can generate a scaled counter associated with the access frequency data and can store the scaled counter in the translation lookaside buffer in response to a translation lookaside buffer miss or in a page table entry upon a translation lookaside buffer eviction or a translation lookaside buffer writeback to provide one or more advantages as compared to conventional memory management techniques such as, for example, facilitating improved storage efficiency for the storage class memory and/or the volatile memory. In yet another embodiment, the access frequency component can generate the access frequency data for utilization in a page replacement algorithm or a page placement algorithm to provide one or more advantages as compared to conventional memory management techniques such as, for example, facilitating improved storage efficiency for the storage class memory and/or the volatile memory. In certain embodiments, the memory management component can store the data in the storage class memory in response to a determination that the access frequency data is below a defined threshold level to provide one or more advantages as compared to conventional memory management techniques such as, for example, facilitating improved storage efficiency for the storage class memory and/or the volatile memory. In certain embodiments, the memory management component can store the data in the volatile memory in response to a determination that the access frequency data is above a defined threshold level to provide one or more advantages as compared to conventional memory management techniques such as, for example, facilitating improved storage efficiency for the storage class memory and/or the volatile memory. In certain embodiments, the memory management component can determine whether to store the data in the storage class memory or the volatile memory to facilitate improved storage efficiency for the storage class memory and/or the volatile memory.

According to another embodiment, a computer-implemented method is provided. The computer-implemented method can comprise storing, by a system operatively coupled to a processor, access frequency data for storage class memory and volatile memory in a translation lookaside buffer, wherein the access frequency data is indicative of a frequency of access to the storage class memory and the volatile memory. The computer-implemented method can also comprise receiving, by the system, data associated with a computing process. Furthermore, the computer-implemented method can comprise determining, by the system, whether to store the data in the storage class memory or the volatile memory based on the access frequency data stored in the translation lookaside buffer. The method can provide various advantages as compared to conventional memory management techniques. In certain embodiments, the method can facilitate improved storage efficiency for memory in a hybrid memory system. In an embodiment, the determining comprises determining whether the access frequency data satisfies a defined criterion to provide one or more advantages as compared to conventional memory management techniques such as, for example, facilitating improved storage efficiency for the storage class memory and/or the volatile memory. In certain embodiments, the computer-implemented method can also comprise storing, by the system, the data in the storage class memory in response to a determination that the access frequency data does not satisfy the defined criterion to provide one or more advantages as compared to conventional memory management techniques such as, for example, facilitating improved storage efficiency for the storage class memory and/or the volatile memory. In certain embodiments, the computer-implemented method can also comprise storing, by the system, the data in the volatile memory in response to a determination that the access frequency data satisfies the defined criterion to provide one or more advantages as compared to conventional memory management techniques such as, for example, facilitating improved storage efficiency for the storage class memory and/or the volatile memory. In certain embodiments, the computer-implemented method can also comprise generating, by the system, a scaled counter associated with the access frequency data, and storing, by the system, the scaled counter in the translation lookaside buffer in response to a translation lookaside buffer miss or in a page table entry upon a translation lookaside buffer eviction or a translation lookaside buffer writeback to provide one or more advantages as compared to conventional memory management techniques such as, for example, facilitating improved storage efficiency for the storage class memory and/or the volatile memory. In certain embodiments, the computer-implemented method can also comprise generating, by the system, the access frequency data for utilization in a page replacement algorithm or a page placement algorithm to provide one or more advantages as compared to conventional memory management techniques such as, for example, facilitating improved storage efficiency for the storage class memory and/or the volatile memory. In an embodiment, the determining comprises improving storage efficiency for the storage class memory and the volatile memory.

According to yet another embodiment, a computer-implemented method is provided. The computer-implemented method can comprise measuring, by a system operatively coupled to a processor, access frequency data for storage class memory and volatile memory in a translation lookaside buffer, wherein the access frequency data is indicative of a frequency of access to the storage class memory and the volatile memory. The computer-implemented method can also comprise storing, by the system, the access frequency data in a counter cache. Furthermore, the computer-implemented method can comprise determining, by the system, whether to store data in the storage class memory or the volatile memory based on the access frequency data stored in the counter cache. The method can provide various advantages as compared to conventional memory management techniques. In certain embodiments, the method can facilitate improved storage efficiency for memory in a hybrid memory system. In an embodiment, the determining comprises determining whether the access frequency data satisfies a defined criterion to provide one or more advantages as compared to conventional memory management techniques such as, for example, facilitating improved storage efficiency for the storage class memory and/or the volatile memory. In certain embodiments, the computer-implemented method can also comprise storing, by the system, the data in the storage class memory in response to a determination that the access frequency data does not satisfy the defined criterion to provide one or more advantages as compared to conventional memory management techniques such as, for example, facilitating improved storage efficiency for the storage class memory and/or the volatile memory. In certain embodiments, the computer-implemented method can also comprise storing, by the system, the data in the volatile memory in response to a determination that the access frequency data satisfies the defined criterion to provide one or more advantages as compared to conventional memory management techniques such as, for example, facilitating improved storage efficiency for the storage class memory and/or the volatile memory. In certain embodiments, the computer-implemented method can also comprise generating, by the system, a scaled counter associated with the access frequency data, and storing, by the system, the scaled counter in the translation lookaside buffer in response to a translation lookaside buffer miss or in a page table entry upon a translation lookaside buffer eviction or a translation lookaside buffer writeback to provide one or more advantages as compared to conventional memory management techniques such as, for example, facilitating improved storage efficiency for the storage class memory and/or the volatile memory. In certain embodiments, the computer-implemented method can also comprise generating, by the system, the access frequency data for utilization in a page replacement algorithm or a page placement algorithm to provide one or more advantages as compared to conventional memory management techniques such as, for example, facilitating improved storage efficiency for the storage class memory and/or the volatile memory. In an embodiment, the determining comprises improving storage efficiency for the storage class memory and the volatile memory.

DESCRIPTION OF THE DRAWINGS

FIG. 4 illustrates an example, non-limiting translation lookaside buffer in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

With recent advancement in computer technology, new storage types are emerging such as Storage Class Memory (SCM). SCM is a nonvolatile memory that is random accessible at byte granularity. Often times, it is desirable to implement SCM in a hybrid memory system that includes two different types of memory. However, implementing SCM in a hybrid memory system can lead to memory latency issues and/or other decreases in performance due to differences in access time and/or frequency for the two different types of memory.

To address these and/or other issues, embodiments described herein include systems, computer-implemented methods, and computer program products that facilitate hybrid memory access frequency. For example, management of hybrid memory can be improved based on hybrid memory access frequency. In an aspect, memory page frequency and/or memory frame frequency can be tracked and/or classified in a hybrid memory system. In an embodiment where hybrid memory includes storage class memory (SCM) and dynamic random-access memory (DRAM), access frequency of memory page frames for the SCM and the DRAM can be measured based on virtual memory manager (VMM) translations and/or translation lookaside buffer (TLB) extensions. In an aspect, access frequency of a memory page can be stored in a bit field (e.g., a two-bit field or a three-bit field) in a memory page table entry. As such, hybrid memory access frequency as disclosed herein can provide various solutions to overcome the aforementioned problems associated with conventional memory management techniques and/or other conventional technologies. For example, efficiency for storing data in a hybrid memory architecture can be improved. Furthermore, access latency to storage class memory and/or volatile memory in a hybrid memory architecture can be reduced. Performance of storage class memory and/or volatile memory in a hybrid memory architecture can also be improved. Furthermore, power consumption by storage class memory and/or volatile memory in a hybrid memory architecture can be reduced.

Figure 1:
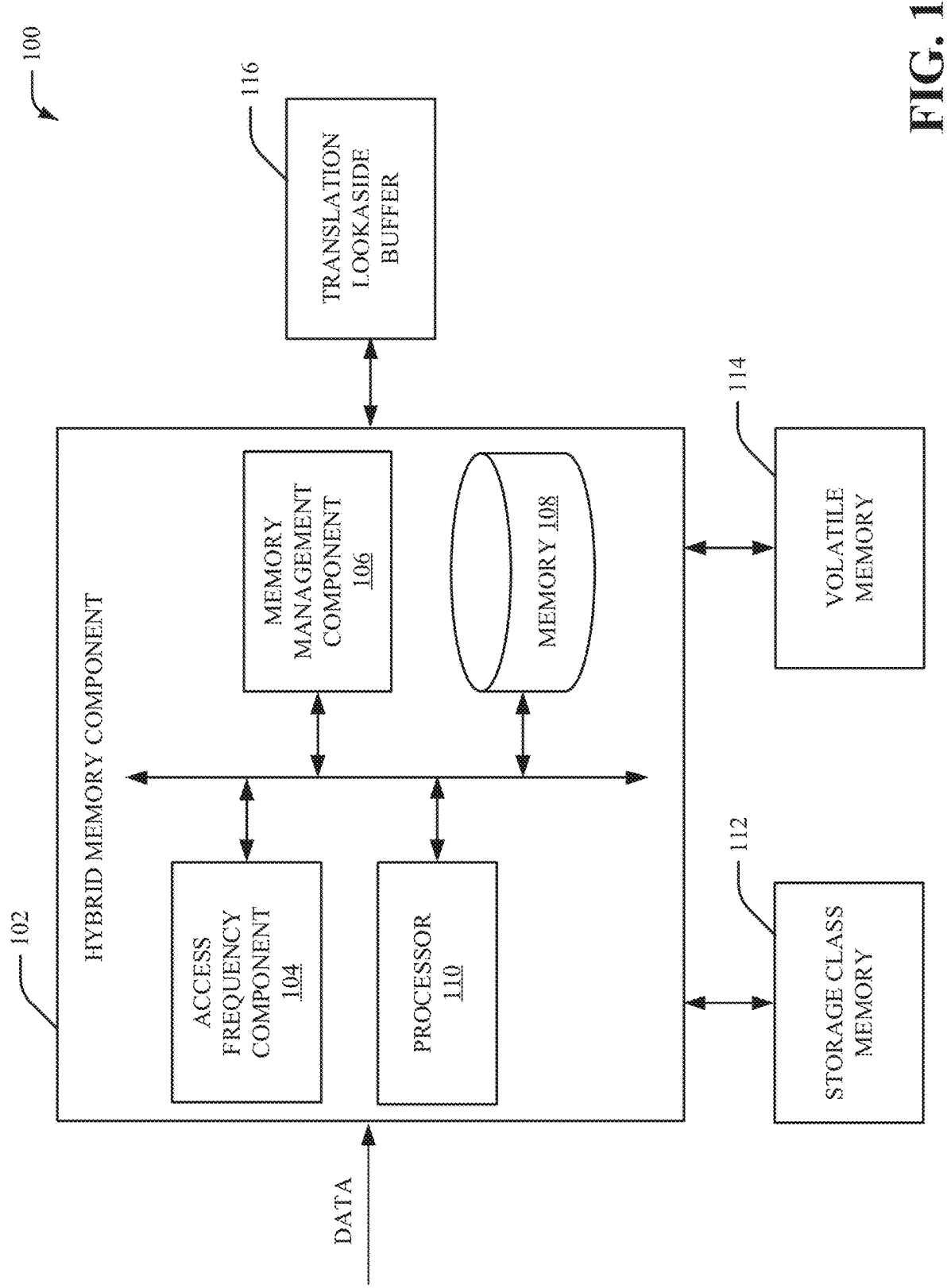
FIG. 1 illustrates a block diagram of an example, non-limiting system that includes a hybrid memory component in accordance with one or more embodiments described herein.

FIG. 1 illustrates a block diagram of an example, non-limiting system 100 that facilitates hybrid memory access frequency in accordance with one or more embodiments described herein. In various embodiments, the system 100 can be a condition detection system associated with technologies such as, but not limited to, computer technologies, memory technologies, hybrid memory technologies, storage class memory technologies, dynamic random-access memory technologies, processor architecture technologies, machine learning technologies, artificial intelligence technologies, digital technologies, and/or other technologies. The system 100 can employ hardware and/or software to solve problems that are highly technical in nature, that are not abstract and that cannot be performed as a set of mental acts by a human. Further, some of the processes performed may be performed by one or more specialized computers (e.g., one or more specialized processing units, a specialized computer with a hybrid memory component, etc.) for carrying out defined tasks related to memory management. The system 100 and/or components of the system can be employed to solve new problems that arise through advancements in technologies mentioned above and/or computer architecture, and the like. One or more embodiments of the system 100 can provide technical improvements to a system associated with technologies such as, but not limited to, computer systems, memory systems, hybrid memory systems, storage class memory systems, dynamic random-access memory systems, processor architecture systems, machine learning systems, artificial intelligence systems, digital systems, and/or other systems.

In the embodiment shown in FIG. 1, the system 100 can include a hybrid memory component 102. As shown in FIG. 1, the hybrid memory component 102 can include an access frequency component 104 and memory management component 106. Aspects of the hybrid memory component 102 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the hybrid memory component 102 can also include memory 108 that stores computer executable components and instructions. Furthermore, the hybrid memory component 102 can include a processor 110 to facilitate execution of the instructions (e.g., computer executable components and corresponding instructions) by the hybrid memory component 102. As shown, the access frequency component 104, the memory management component 106, the memory 108 and/or the processor 110 can be electrically and/or communicatively coupled to one another in one or more embodiments. In certain embodiments, the hybrid memory component 102 can be in communication with a storage class memory 112 and/or a volatile memory 114. Additionally or alternatively, in certain embodiments, the hybrid memory component 102 can be in communication with a translation lookaside buffer 116. In one example, the volatile memory 114 can be DRAM memory. However, it is to be appreciated that, in certain embodiments, the volatile memory 114 can be a different type of volatile memory. The storage class memory 112 can be, for example, a type of nonvolatile memory that is random accessible at by granularity. As disclosed herein, a "frame" is a portion of memory of a physical address range of a memory architecture. A frame can be identified by a corresponding frame number. A physical address can be constructed from a frame number multiplied by a frame size and concatenated with a logical address offset. Furthermore, as disclosed herein, a "frame table" can be an operating system array of structures that keeps track of mappings and metadata for frames. Additionally, as disclosed herein, a "page table" is a translation table that provides information on how a virtual addresses accessed in a computing process is translated to a physical addresses that are transmitted via a bus. In particular, a virtual page number can be extracted from a virtual address by dropping a page offset (e.g., same size as a corresponding frame) from a virtual address and indexed into a page table.

In an embodiment, the access frequency component 104 can store access frequency data for the storage class memory 112 and the volatile memory 114 in the translation lookaside buffer 116. For instance, the access frequency component 104 can store access frequency data for the storage class memory 112 and the volatile memory 114 in a set of bits in the translation lookaside buffer 116. A size of the translation lookaside buffer 116 can be extended, for example, to obtain the set of bits to store the access frequency data. Additionally or alternatively, the set of bits can be, for example, a set of previously unused bits in the translation lookaside buffer 116. The access frequency data can be indicative of a frequency of access to the storage class memory 112 and/or a frequency of access to the volatile memory 114. For example, the access frequency data can include information for access frequency of storage class memory frames associated with the storage class memory 112 and/or information for access frequency of volatile memory frames (e.g., DRAM frames) associated with the volatile memory 114. In certain embodiments, the access frequency data can include a scaled counter associated with access frequency to the storage class memory 112 and/or the volatile memory 114. For example, the access frequency data can include a scaled counter of a virtual page access frequency. In an aspect, the access frequency component 104 can determine the access frequency data based on VMM translations associated with the storage class memory 112 and/or the volatile memory 114. Additionally or alternatively, the access frequency component 104 can determine the access frequency data based on TLB extensions associated with the storage class memory 112 and/or the volatile memory 114. For example, access frequency of memory page frames for the storage class memory 112 and/or the volatile memory 114 can be measured based on VMM translations and/or TLB extensions. In certain embodiments, the access frequency component generates a scaled counter and can store the scaled counter in the translation lookaside buffer 116 in response to a translation lookaside buffer miss, or in a page table entry associated with the translation lookaside buffer 116 upon a translation lookaside buffer eviction or a translation lookaside buffer writeback. For instance, in an embodiment where a translation lookaside buffer miss occurs, a translation lookaside buffer entry can be established from a corresponding page table entry. Furthermore, a portion of the page table entry can be converted into a scaled counter to populate a corresponding translation lookaside counter value. In another embodiment where a translation lookaside buffer eviction occurs, a corresponding translation lookaside counter value can be scaled back to an index value that is stored in a corresponding page table entry. In another aspect, the access frequency component 104 can store the access frequency data in a bit field of a page table associated with the translation lookaside buffer 116. For example, the access frequency component 104 can store the access frequency data in a 2-bit bit field of a page table associated with the translation lookaside buffer 116. In another example, the access frequency component 104 can store the access frequency data in a 3-bit bit field of a page table associated with the translation lookaside buffer 116. However, it is to be appreciated that the access frequency component 104 can store the access frequency data in a differently sized bit field of a page table associated with the translation lookaside buffer 116. In another embodiment, the access frequency component 104 can maintain a counter associated with the access frequency data in a page table entry. For example, a page table entry associated with the translation lookaside buffer 116 can be expanded by a scaled counter to facilitate storage of the access frequency data. In certain embodiments, the access frequency component 104 can generate the access frequency data for utilization in a page replacement algorithm or a page placement algorithm. For instance, the access frequency component 104 can generate the access frequency data for utilization in a clock page replacement technique. The clock page replacement technique can determine a particular page to replace when a new page is available. Additionally or alternatively, the access frequency component 104 can generate the access frequency data for utilization in a least frequently used page replacement technique. The least frequently used page replacement technique can replace a page that is determined to be used least frequently from a set of pages. In an embodiment, the access frequency component 104 can collect the access frequency data by scanning a frame table associated with the storage class memory 112 and/or the volatile memory 114 using a clock page replacement technique and/or a least frequently used page replacement technique. The access frequency component 104 can also collect reference bits and/or modify bits from page table entries that map a particular frame to facilitate determination as to whether a frame is accessed or modified since a previous inspection or a previous reset.

The memory management component 106 can determine whether to store data in the storage class memory or the volatile memory based on the access frequency data stored in the translation lookaside buffer (e.g., a page table entry associated with the translation lookaside buffer). For instance, the memory management component 106 can determine whether the access frequency data satisfies a defined criterion. In one example, the memory management component 106 can determine whether the access frequency data is below or above a defined threshold level. The threshold level can be, for example, a particular level of access frequency to the storage class memory 112 and/or the volatile memory 114. In certain embodiments, the memory management component 106 can compare the access frequency data to a set of defined threshold values that represent different levels of access frequency to the storage class memory 112 and/or the volatile memory 114. As such, the access frequency data can facilitate classification of a level of access frequency for the storage class memory 112 and/or the volatile memory 114. In an aspect, the memory management component 106 can store the data in the storage class memory in response to a determination that the access frequency data is below a defined threshold level. In another aspect, the memory management component 106 can store the data in the volatile memory in response to a determination that the access frequency data is above a defined threshold level. In certain embodiments, the memory management component 106 can migrate SCM frames associated with a particular level of access frequency (e.g., hot SCM frames) to the volatile memory 114. Additionally or alternatively, the memory management component 106 can migrate DRAM frames associated with a particular level of access frequency (e.g., cold DRAM frames) to the storage class memory 112.

It is to be appreciated that the hybrid memory component 102 (e.g., the access frequency component 104 and/or the memory management component 106) performs a memory management process that cannot be performed by a human (e.g., is greater than the capability of a single human mind). For example, an amount of data processed, a speed of processing of data (e.g., a speed of processing data associated with multiple parties) and/or data types processed by the hybrid memory component 102 (e.g., the access frequency component 104 and/or the memory management component 106) over a certain period of time can be greater, faster and different than an amount, speed and data type that can be processed by a single human mind over the same period of time. The hybrid memory component 102 (e.g., the access frequency component 104 and/or the memory management component 106) can also be fully operational towards performing one or more other functions (e.g., fully powered on, fully executed, etc.) while also performing the above-referenced memory management process. Moreover, the hybrid memory component 102 (e.g., the access frequency component 104 and/or the memory management component 106) can perform a memory management process that is impossible to perform manually by a user.

Additionally, it is to be appreciated that the system 100 can provide various advantages as compared to conventional memory management techniques. The system 100 can also provide various solutions to problems associated with conventional memory management techniques. For instance, efficiency for storing data in a hybrid memory architecture can be improved by employing the system 100. Furthermore, access latency to storage class memory and/or volatile memory in a hybrid memory architecture can be reduced by employing the system 100. Performance of storage class memory and/or volatile memory in a hybrid memory architecture can also be improved by employing the system 100. In addition, power consumption by storage class memory and/or volatile memory in a hybrid memory architecture can be reduced by employing the system 100.

Figure 2:
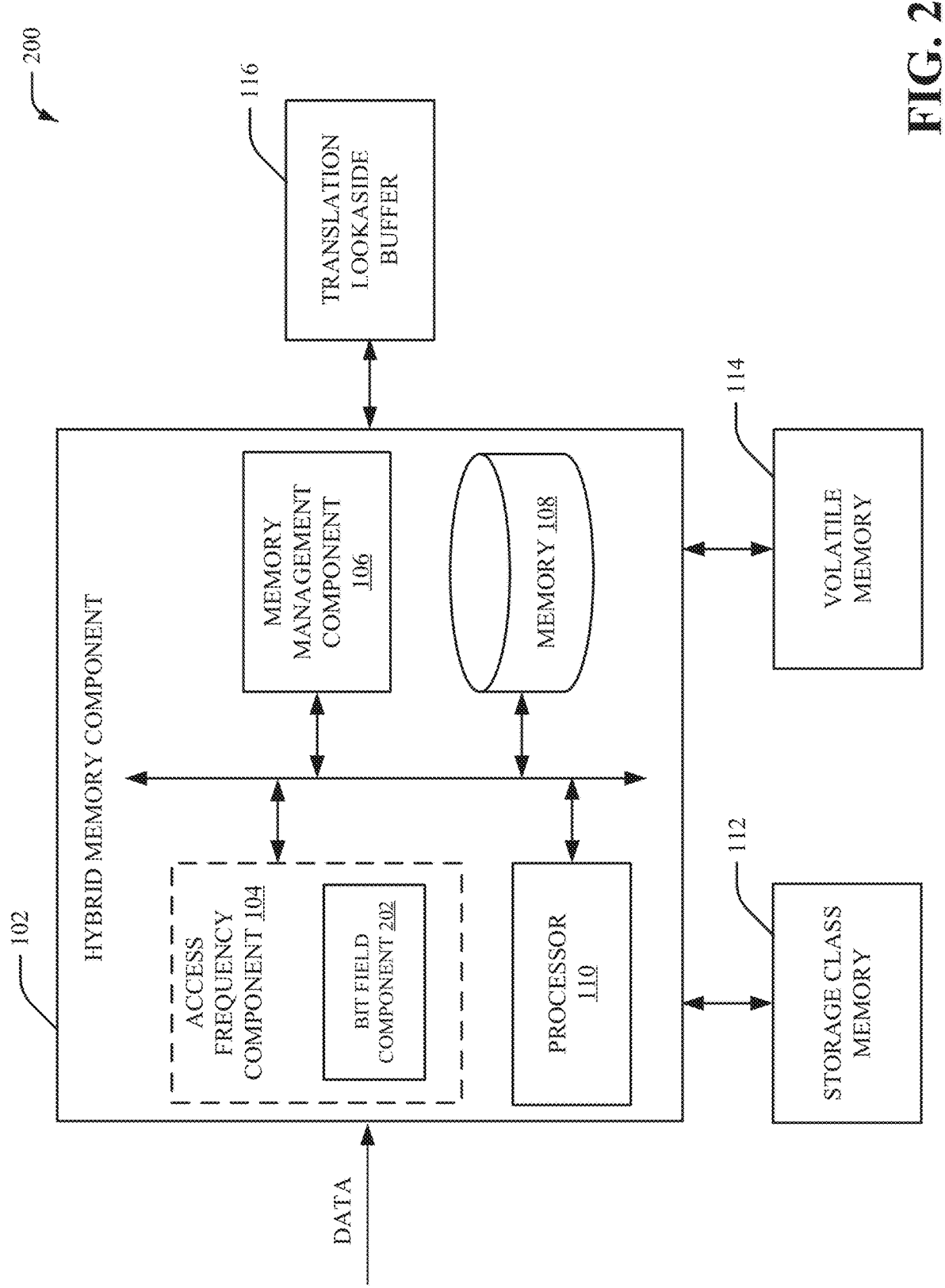
FIG. 2 illustrates a block diagram of another example, non-limiting system that includes a hybrid memory component in accordance with one or more embodiments described herein.

FIG. 2 illustrates a block diagram of an example, non-limiting system 200 in accordance with one or more embodiments described herein. Repetitive description of like elements employed in other embodiments described herein is omitted for sake of brevity.

The system 200 includes the hybrid memory component 102. The hybrid memory component 102 can include the access frequency component 104, the memory management component 106, the memory 108 and/or the processor 110. Additionally, in certain embodiments, the system 200 can include the storage class memory 112, the volatile memory 114 and/or the translation lookaside buffer 116. In the embodiment shown in FIG. 2, the access frequency component 104 can include a bit field component 202. The bit field component 202 can store the access frequency data in a bit field of the translation lookaside buffer 116. For example, a size of the translation lookaside buffer 116 can be extended, for example, to obtain the bit field to store the access frequency data. Additionally or alternatively, the bit field can be, for example, a set of previously unused bits in the translation lookaside buffer 116. In certain embodiments, the bit field component 202 can store the access frequency data in a bit field of a page table associated with the translation lookaside buffer 116. For example, a size of a page table associated with the translation lookaside buffer 116 can be extended, for example, to obtain the bit field to store the access frequency data. In one example, the bit field can be a 2-bit bit field of the translation lookaside buffer 116. In another example, the bit field can be a 3-bit bit field of the translation lookaside buffer 116. However, it is to be appreciated that the bit field component 202 can store the access frequency data in a differently sized bit field of the translation lookaside buffer 116.

Additionally, it is to be appreciated that the system 200 can provide various advantages as compared to conventional memory management techniques. The system 200 can also provide various solutions to problems associated with conventional memory management techniques. For instance, efficiency for storing data in a hybrid memory architecture can be improved by employing the system 200. Furthermore, access latency to storage class memory and/or volatile memory in a hybrid memory architecture can be reduced by employing the system 200. Performance of storage class memory and/or volatile memory in a hybrid memory architecture can also be improved by employing the system 200. In addition, power consumption by storage class memory and/or volatile memory in a hybrid memory architecture can be reduced by employing the system 200.

Figure 3:
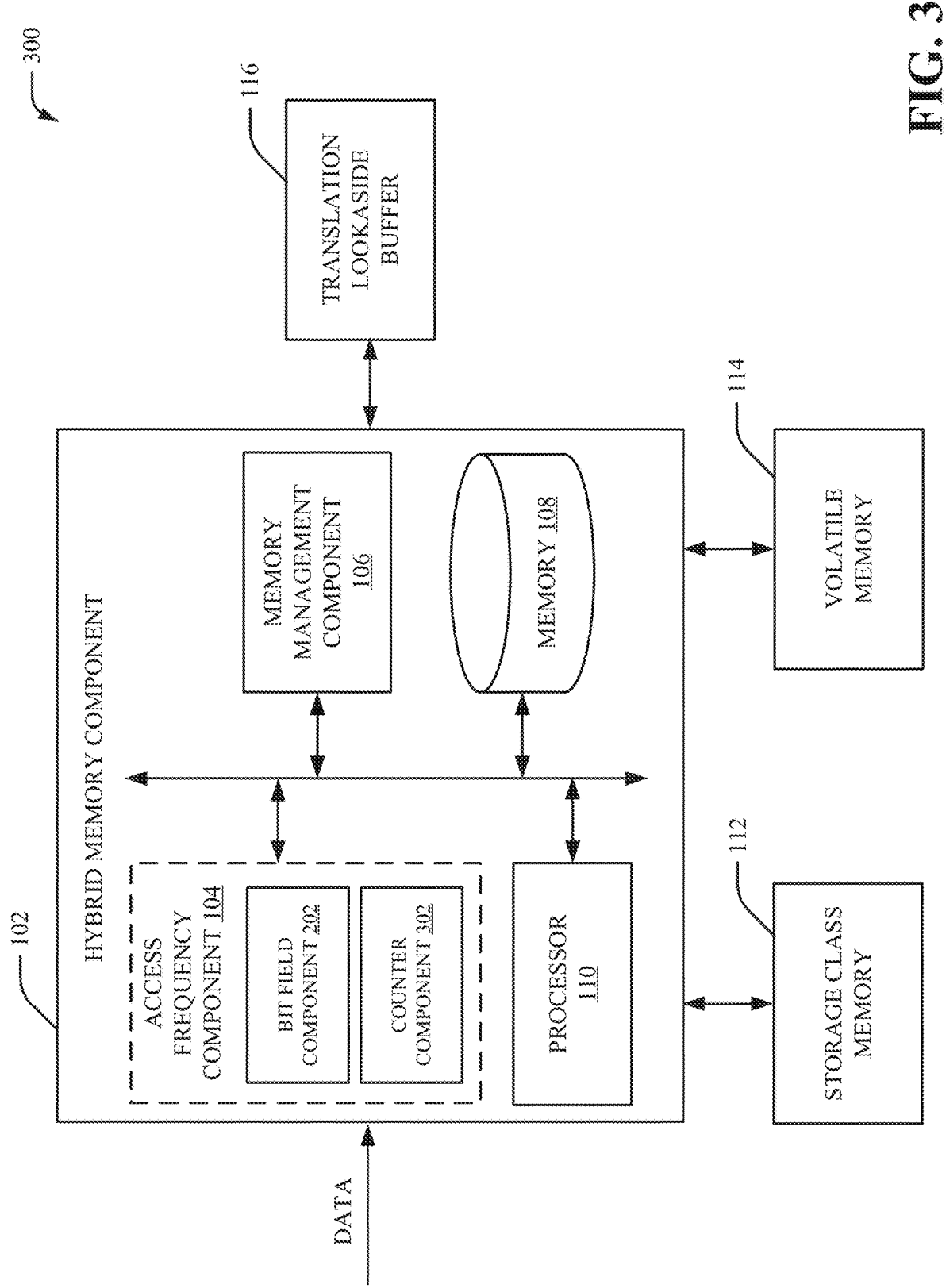
FIG. 3 illustrates a block diagram of yet another example, non-limiting system that includes a hybrid memory component in accordance with one or more embodiments described herein.

FIG. 3 illustrates a block diagram of an example, non-limiting system 300 in accordance with one or more embodiments described herein. Repetitive description of like elements employed in other embodiments described herein is omitted for sake of brevity.

The system 300 includes the hybrid memory component 102. The hybrid memory component 102 can include the access frequency component 104, the memory management component 106, the memory 108 and/or the processor 110. Additionally, in certain embodiments, the system 300 can include the storage class memory 112, the volatile memory 114 and/or the translation lookaside buffer 116. In the embodiment shown in FIG. 3, the access frequency component 104 can include the bit field component 202 and/or a counter component 302. The counter component 302 can manage a set of counters included in the translation lookaside buffer 116. The set of counters managed by the counter component 302 can be a counter regarding a number of accesses to the storage class memory 112 and/or the volatile memory 114. In an aspect, the set of counters managed by the counter component 302 can be a counter regarding a number of accesses by a set of memory frames to the storage class memory 112 and/or the volatile memory 114. For instance, the counter component 302 can manage a first counter associated with access frequency for a first memory frame to the storage class memory 112 and/or the volatile memory 114, a second counter associated with access frequency for a second memory frame to the storage class memory 112 and/or the volatile memory 114, a third counter associated with access frequency for a third memory frame to the storage class memory 112 and/or the volatile memory 114, etc. In certain embodiments, the counter component 302 can manage a set of counters included in a page table entry associated with the translation lookaside buffer 116. In certain embodiments, the counter component 302 can manage a set of counters included in a counter cache.

Additionally, it is to be appreciated that the system 300 can provide various advantages as compared to conventional memory management techniques. The system 300 can also provide various solutions to problems associated with conventional memory management techniques. For instance, efficiency for storing data in a hybrid memory architecture can be improved by employing the system 300. Furthermore, access latency to storage class memory and/or volatile memory in a hybrid memory architecture can be reduced by employing the system 300. Performance of storage class memory and/or volatile memory in a hybrid memory architecture can also be improved by employing the system 300. In addition, power consumption by storage class memory and/or volatile memory in a hybrid memory architecture can be reduced by employing the system 300.

FIG. 4 illustrates a block diagram of an example, non-limiting system 400 in accordance with one or more embodiments described herein. Repetitive description of like elements employed in other embodiments described herein is omitted for sake of brevity.

The system 400 includes a translation lookaside buffer 402. The translation lookaside buffer 402 can include a tag 403 section, a frame number 404 section, a modify/access right bits 406 section and/or a counter 408 section. In an aspect, the access frequency data generated by the access frequency component 104 can be stored in the counter 408 portion. For example, data associated with a computing process can be associated with information stored in the tag 403 section, the frame number 404 section, the modify/access right bits 406 section and/or the counter 408 section of the translation lookaside buffer 402. In an aspect, the counter 408 section can include a set of counters regarding a number of accesses by a set of memory frames to the storage class memory 112 and/or the volatile memory 114. For instance, the counter 408 section can include a first counter associated with access frequency for a first memory frame to the storage class memory 112 and/or the volatile memory 114, a second counter associated with access frequency for a second memory frame to the storage class memory 112 and/or the volatile memory 114, a third counter associated with access frequency for a third memory frame to the storage class memory 112 and/or the volatile memory 114, etc. In an embodiment, the counter 408 section can measure accesses to a virtual page associated with the tag 403 section and by fiat to the frame number 404 section that provides physical memory to the virtual page. For instance, the counter 408 section can include a first counter associated with access frequency to a first memory frame that is inferred from a first virtual page associated with the storage class memory 112 and/or the volatile memory 114, a second counter associated with access frequency to a second memory frame that is inferred from a second virtual page associated with the storage class memory 112 and/or the volatile memory 114, a third counter associated with access frequency to a third memory frame that is inferred from a third virtual page associated with the storage class memory 112 and/or the volatile memory 114, etc. As such, tracking and/or classifying access frequency to the storage class memory 112 and/or the volatile memory 114 can be an integrated mechanism achieved via the translation lookaside buffer 402.

Additionally, it is to be appreciated that the system 400 can provide various advantages as compared to conventional memory management techniques. The system 400 can also provide various solutions to problems associated with conventional memory management techniques. For instance, efficiency for storing data in a hybrid memory architecture can be improved by employing the system 400. Furthermore, access latency to storage class memory and/or volatile memory in a hybrid memory architecture can be reduced by employing the system 400. Performance of storage class memory and/or volatile memory in a hybrid memory architecture can also be improved by employing the system 400. In addition, power consumption by storage class memory and/or volatile memory in a hybrid memory architecture can be reduced by employing the system 400.

Figure 5:
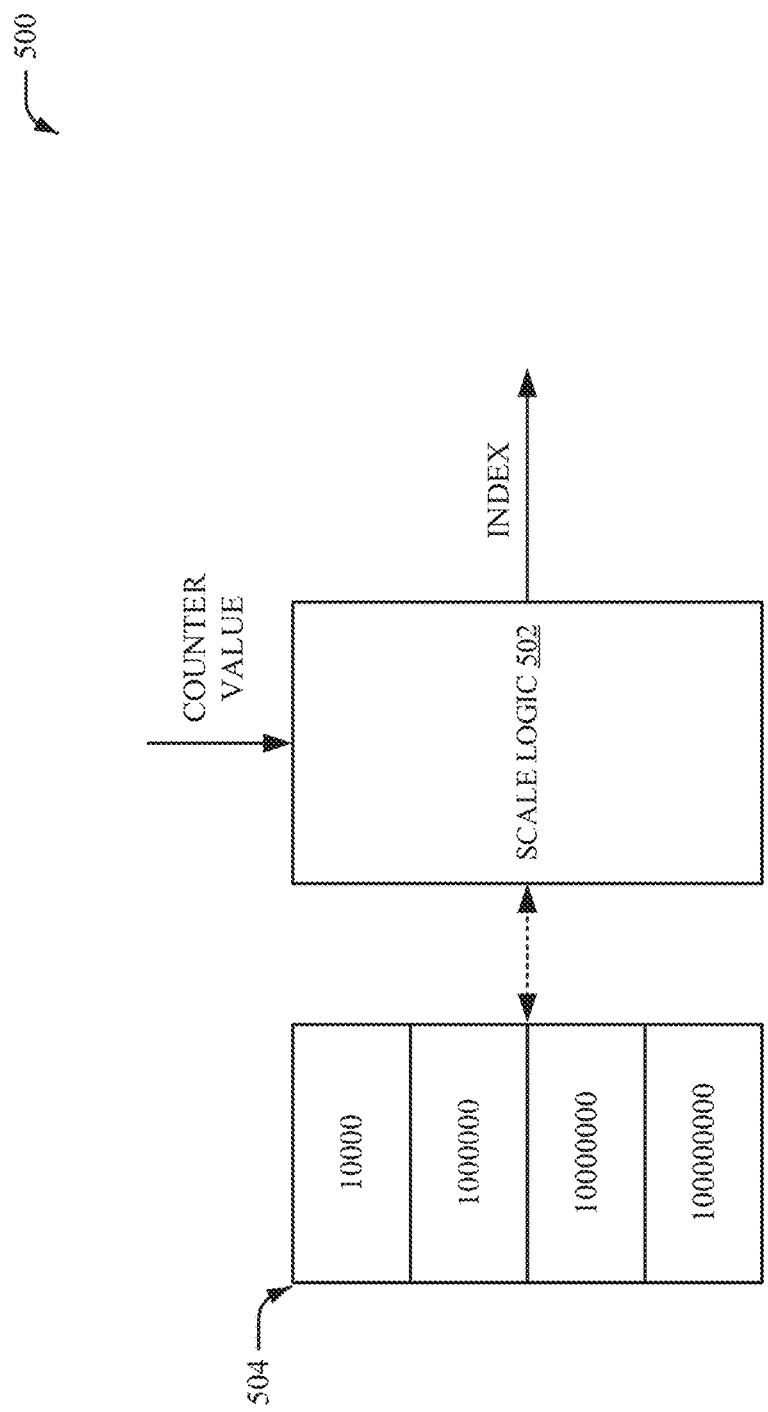
FIG. 5 illustrates yet another example, non-limiting system associated with hybrid memory access frequency in accordance with one or more embodiments described herein.

FIG. 5 illustrates a block diagram of an example, non-limiting system 500 in accordance with one or more embodiments described herein. Repetitive description of like elements employed in other embodiments described herein is omitted for sake of brevity.

The system 500 includes scale logic 502. The scale logic 502 can employ data from a scale table 504 and/or a counter value (e.g., COUNTER VALUE shown in FIG. 5) to generate an index (e.g., INDEX shown in FIG. 5). The counter value can be, for example, a counter value stored in a translation lookaside buffer (e.g., the translation lookaside buffer 402, the translation lookaside buffer 502, etc.). In an aspect, the scale table 504 can include a set of counter threshold values that represent different levels of access frequency to storage class memory (e.g., storage class memory 112) and/or volatile memory (e.g., volatile memory 114). For example, the scale table 504 can include a first counter threshold value (e.g., 10000) that represents a first access frequency (e.g., cold access frequency), a second counter threshold value (e.g., 1000000) that represents a second access frequency (e.g., medium cold access frequency), a third counter threshold value (e.g., 10000000) that represents a third access frequency (e.g., medium hot access frequency), a fourth counter threshold value (e.g., 100000000) that represents a fourth access frequency (e.g., hot access frequency), etc. As such, the scale table 504 can be employed as a quasi-logarithmic access frequency scale.

The scale logic 502 can convert the counter value to the index based on the scale table 504. For example, in a non-limiting example where the counter value is equal to 90000, the counter value can assign an index associated with the first counter threshold value. In another non-limiting example where the counter value is equal to 1100000000, the counter value can assign an index associated with the fourth counter threshold value. In certain embodiments, the index can be stored in a page table for storage class memory (e.g., the storage class memory 112) and/or volatile memory (e.g., the volatile memory 114).

Additionally, it is to be appreciated that the system 500 can provide various advantages as compared to conventional memory management techniques. The system 500 can also provide various solutions to problems associated with conventional memory management techniques. For instance, efficiency for storing data in a hybrid memory architecture can be improved by employing the system 500. Furthermore, access latency to storage class memory and/or volatile memory in a hybrid memory architecture can be reduced by employing the system 500. Performance of storage class memory and/or volatile memory in a hybrid memory architecture can also be improved by employing the system 500. In addition, power consumption by storage class memory and/or volatile memory in a hybrid memory architecture can be reduced by employing the system 500.

Figure 6:
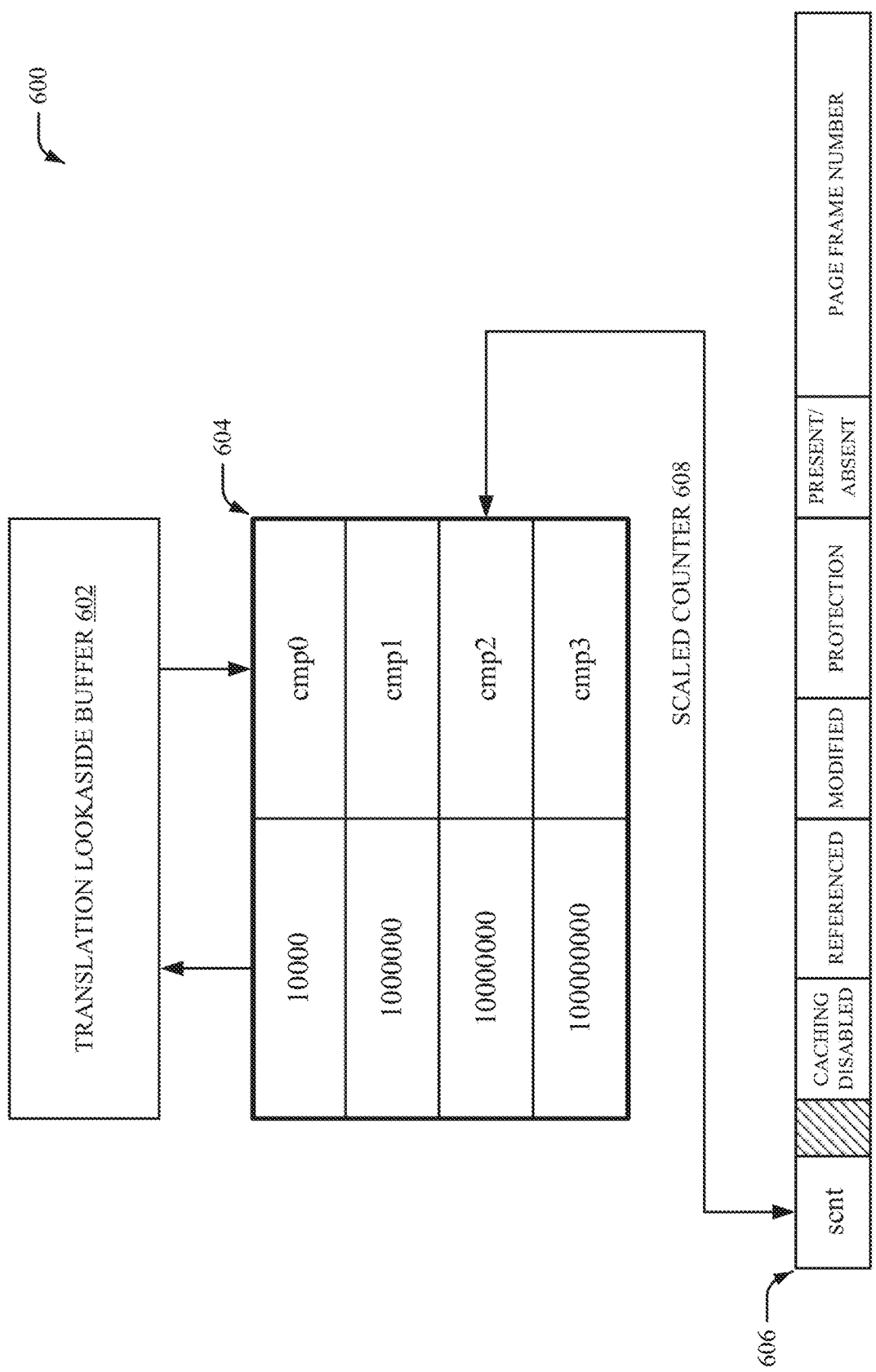
FIG. 6 illustrates an example, non-limiting system associated with hybrid memory access frequency in accordance with one or more embodiments described herein.

FIG. 6 illustrates a block diagram of an example, non-limiting system 600 in accordance with one or more embodiments described herein. Repetitive description of like elements employed in other embodiments described herein is omitted for sake of brevity.

The system 600 includes a translation lookaside buffer 602, a scale table 604, and a page table entry 606. In one example, the translation lookaside buffer 602 can be formatted with a tag section, a frame number section, a modify/access right bits section and/or a counter section as shown, for example, in connection with the translation lookaside buffer 402. In an embodiment, the scale table 604 can correspond to the system 500. In an embodiment where a virtual address is accessed and a translation is not present in the translation lookaside buffer 602, a translation lookaside buffer entry for the virtual address can be determined. The translation lookaside buffer entry can be loaded with information from the page table entry 606 associated with the accessed virtual page. The information from the page table entry 606 can include, for example, a tag, a frame number, reference and modify bits, access right bits, and/or counter bits associated with an access frequency number. In an aspect, at least a portion of the page table 606 can include an index returned from the scale logic 502 and/or the scale table 604. In another aspect, a scaled counter 608 can be employed to translate and/or map information between the scale table 604 and the page table entry 606. For example, the scaled counter 608 can be a classification for access frequency to the storage class memory 112 and/or the volatile memory 114. In certain embodiments, the scaled counter 608 can be generated based on a lookup mechanism process associated with the scale table 604. For instance, the scale logic 502 can be employed to load a counter from the scale table 504 at an index of "scnt" (e.g., to store the counter from the scale table 504) when establishing a translation lookaside buffer entry. In an embodiment, the scaled counter 608 can include the index generated by the scale logic 502. Virtual address translations through a page table can be cached in the translation lookaside buffer 602. In an embodiment where a translation lookaside buffer miss occurs, a translation lookaside buffer entry can be established from the page table entry 606. Furthermore, the "scnt" portion of the page table entry 606 can be converted to scale table[scnt] to populate a corresponding translation lookaside counter value (e.g., to populate the counter 408 section). In another embodiment where a translation lookaside buffer eviction occurs, a corresponding translation lookaside counter value (e.g., a value of the counter 408 section) can be scaled back to an index value that is stored in the page table entry 606. As such, a set of bits can be saved in a page table that are typically unavailable in a conventional memory architecture.

Additionally, it is to be appreciated that the system 600 can provide various advantages as compared to conventional memory management techniques. The system 600 can also provide various solutions to problems associated with conventional memory management techniques. For instance, efficiency for storing data in a hybrid memory architecture can be improved by employing the system 600. Furthermore, access latency to storage class memory and/or volatile memory in a hybrid memory architecture can be reduced by employing the system 600. Performance of storage class memory and/or volatile memory in a hybrid memory architecture can also be improved by employing the system 600. In addition, power consumption by storage class memory and/or volatile memory in a hybrid memory architecture can be reduced by employing the system 600.

Figure 7:
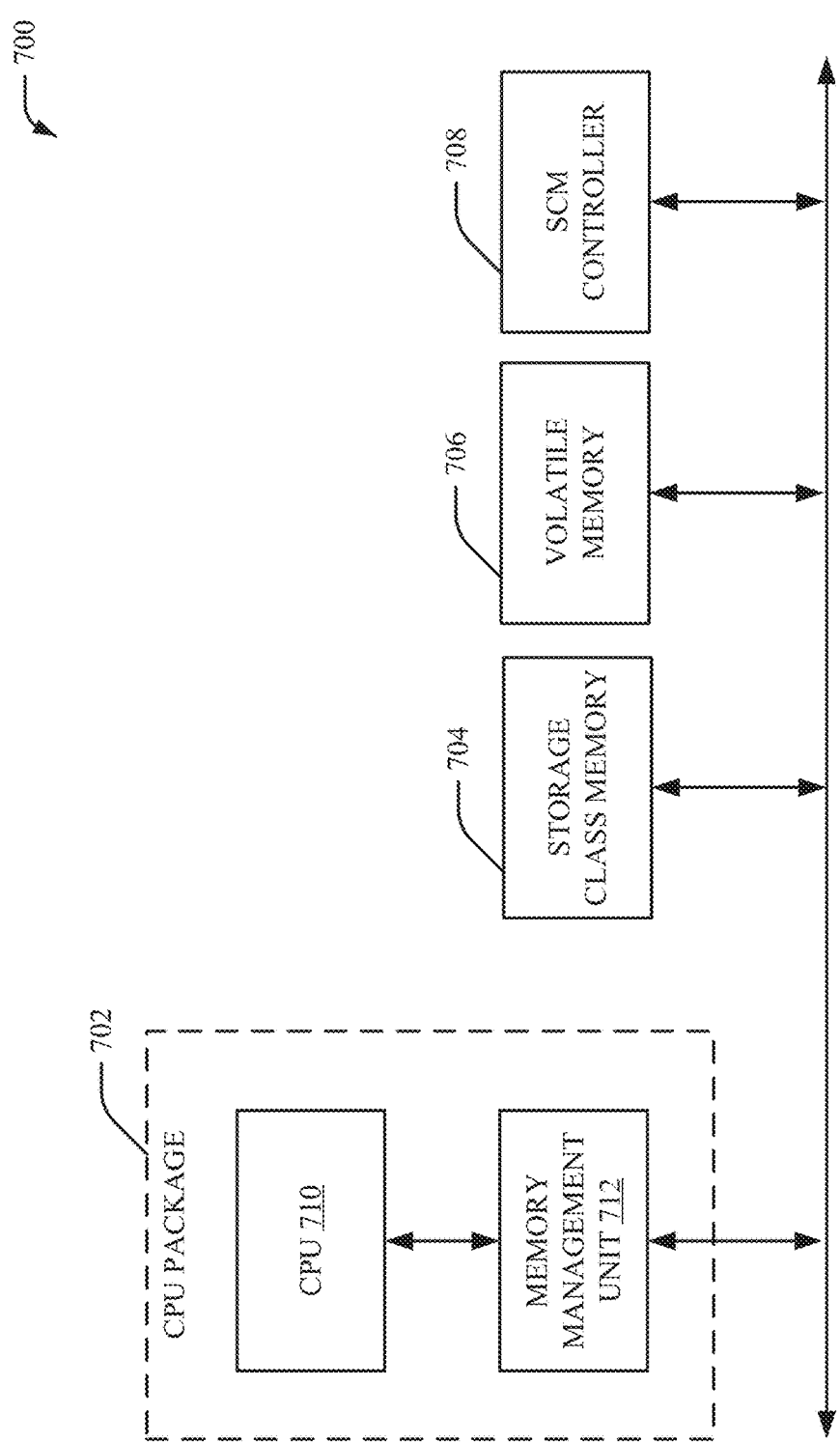
FIG. 7 illustrates another example, non-limiting system associated with hybrid memory access frequency in accordance with one or more embodiments described herein.

FIG. 7 illustrates a block diagram of an example, non-limiting system 700 in accordance with one or more embodiments described herein. Repetitive description of like elements employed in other embodiments described herein is omitted for sake of brevity.

The system 700 includes a central processing unit (CPU) package 702, a storage class memory 704, a volatile memory 706, and a storage class memory (SCM) controller 708. The CPU package 702 can include a CPU 710 and/or a memory management unit 712. The storage class memory 704 can, for example, correspond to the storage class memory 112. The volatile memory 706 can, for example, correspond to the volatile memory 114. The CPU 710 can generate data associated with a computing process that is stored in the storage class memory 704 and/or the volatile memory 706. In an embodiment, the SCM controller 708 can be extended with a set of counters. The set of counters can be configured, for example, at a granularity associated with a page translation mechanism. In an aspect, on every access to the storage class memory 704 and/or the volatile memory 706 by the CPU 710 and/or the memory management unit 712, a counter of the SCM controller 708 that is associated with a frame can be incremented in hardware (e.g., a translation lookaside buffer or a counter cache). In certain embodiments, at least a portion of the hybrid memory component 102 can be implemented on the SCM controller 708. Additionally or alternatively, at least a portion of the hybrid memory component 102 can be implemented on the memory management unit 712.

In an aspect, the hybrid memory component 102 can scan the set of counters associated with the SCM controller 708 to identify one or more frames that are accessed beyond a defined threshold level associated with access frequency. The hybrid memory component 102 can move one or more memory frames associated with the storage class memory 704 to the volatile memory 706 in response to a determination that the one or more memory frames satisfy a defined criterion associated with access frequency. Additionally or alternatively, the hybrid memory component 102 can move one or more memory frames associated with the volatile memory 706 to the storage class memory 704 in response to a determination that the one or more memory frames satisfy a defined criterion associated with access frequency. In an embodiment, the CPU 710 can send a virtual address to the memory management unit 712 to facilitate a memory management process. Furthermore, the memory management unit 712 can send the physical address to the SCM controller 708 to facilitate the memory management process.

Additionally, it is to be appreciated that the system 700 can provide various advantages as compared to conventional memory management techniques. The system 700 can also provide various solutions to problems associated with conventional memory management techniques. For instance, efficiency for storing data in a hybrid memory architecture can be improved by employing the system 700. Furthermore, access latency to storage class memory and/or volatile memory in a hybrid memory architecture can be reduced by employing the system 700. Performance of storage class memory and/or volatile memory in a hybrid memory architecture can also be improved by employing the system 700. In addition, power consumption by storage class memory and/or volatile memory in a hybrid memory architecture can be reduced by employing the system 700.

Figure 8:
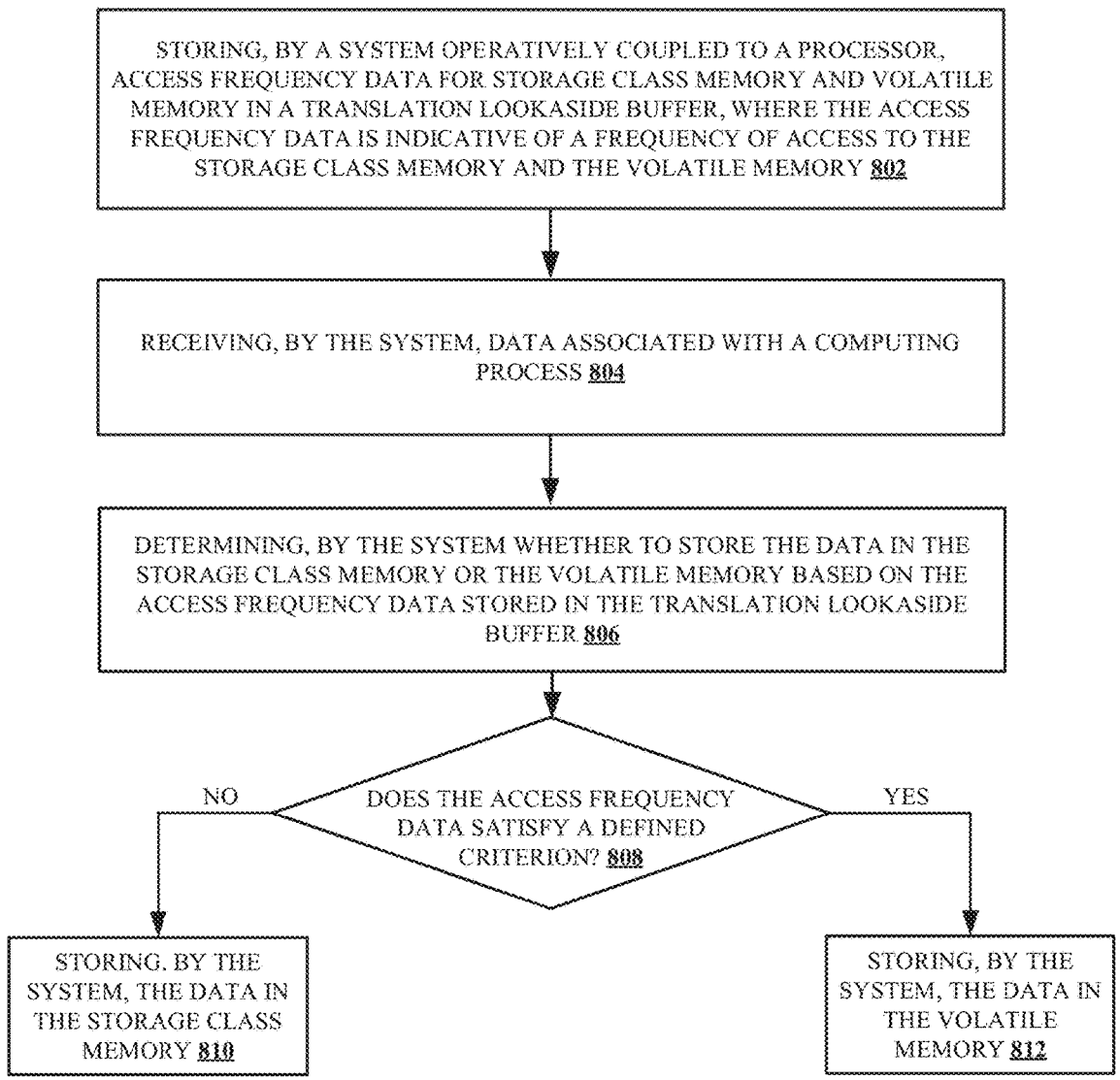
FIG. 8 illustrates a flow diagram of an example, non-limiting computer-implemented method for facilitating hybrid memory access frequency in accordance with one or more embodiments described herein.

FIG. 8 illustrates a flow diagram of an example, non-limiting computer-implemented method 800 for facilitating hybrid memory access frequency in accordance with one or more embodiments described herein. At 802, access frequency data for storage class memory and volatile memory is stored, by a system operatively coupled to a processor (e.g., by access frequency component 104), in a translation lookaside buffer, where the access frequency data is indicative of a frequency of access to the storage class memory and the volatile memory. For instance, the access frequency data can be stored in a set of bits in the translation lookaside buffer. A size of the translation lookaside buffer can be extended, for example, to obtain the set of bits to store the access frequency data. Additionally or alternatively, the set of bits can be, for example, a set of previously unused bits in the translation lookaside buffer. In an aspect, the access frequency data can include information for access frequency of storage class memory frames associated with the storage class memory and/or information for access frequency of volatile memory frames (e.g., DRAM frames) associated with the volatile memory. In certain embodiments, the access frequency data can include a scaled counter associated with access frequency to the storage class memory and/or the volatile memory.

At 804, data associated with a computing process is received by the system (e.g., by memory management component 106). For example, data associated with a computing process can be received by a CPU. In one example, the data can be associated with a memory frame.

At 806, it is determined (e.g., by memory management component 106) whether to store the data in the storage class memory or the volatile memory based on the access frequency data stored in the translation lookaside buffer.

At 808, it is determined whether the access frequency data satisfies a defined criterion. The defined criterion can be associated with a defined threshold level for access frequency. If no, the computer-implemented method 800 proceeds to 810. If yes, the computer-implemented method 800 proceeds to 812. At 810, the data is stored, by the system (e.g., by memory management component 106), in the storage class memory. At 812, the data is stored, by the system (e.g., by memory management component 106), in the volatile memory. In certain embodiments, the computer-implemented method 800 can further include generating the access frequency for utilization in a page replacement algorithm or a page placement algorithm. In certain embodiments, the computer-implemented method 800 can further include generating a scaled counter associated with the access frequency data. Additionally or alternatively, the computer-implemented method 800 can further include storing the scaled counter in the translation lookaside buffer in response to a translation lookaside buffer miss, or in a page table entry associated with the translation lookaside buffer upon a translation lookaside buffer eviction or a translation lookaside buffer writeback.

Figure 9:
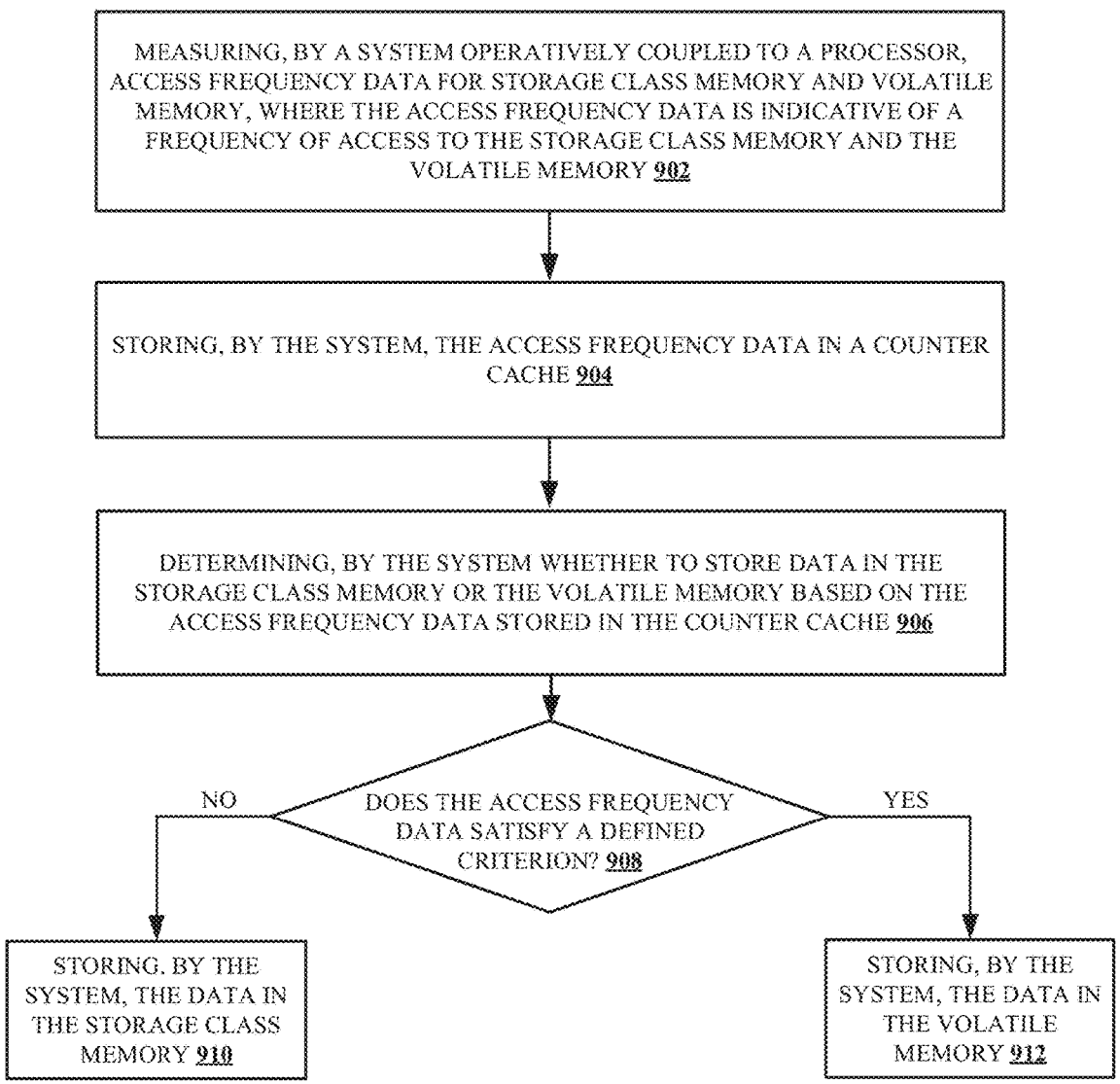
FIG. 9 illustrates a flow diagram of another example, non-limiting computer-implemented method for facilitating hybrid memory access frequency in accordance with one or more embodiments described herein.

FIG. 9 illustrates a flow diagram of an example, non-limiting computer-implemented method 900 for facilitating hybrid memory access frequency in accordance with one or more embodiments described herein. At 902, access frequency data for storage class memory and volatile memory is measured, by a system operatively coupled to a processor (e.g., by access frequency component 104), where the access frequency data is indicative of a frequency of access to the storage class memory and the volatile memory. For instance, the access frequency data can include information for access frequency of storage class memory frames associated with the storage class memory and/or information for access frequency of volatile memory frames (e.g., DRAM frames) associated with the volatile memory. In certain embodiments, the access frequency data can include a scaled counter associated with access frequency to the storage class memory and/or the volatile memory.

At 904, the access frequency data is stored, by the system (e.g., by memory management component 106), in a counter cache. The counter cache can be, for example, a counter cache of a SCM controller.

At 906, it is determined (e.g., by memory management component 106) whether to store the data in the storage class memory or the volatile memory based on the access frequency data stored in the counter cache.

At 908, it is determined whether the access frequency data satisfies a defined criterion. The defined criterion can be associated with a defined threshold level for access frequency. If no, the computer-implemented method 900 proceeds to 910. If yes, the computer-implemented method 900 proceeds to 912. At 910, the data is stored, by the system (e.g., by memory management component 106), in the storage class memory. At 912, the data is stored, by the system (e.g., by memory management component 106), in the volatile memory. In certain embodiments, the computer-implemented method 900 can further include generating the access frequency for utilization in a page replacement algorithm or a page placement algorithm. In certain embodiments, the computer-implemented method 900 can further include generating a scaled counter associated with the access frequency data. Additionally or alternatively, the computer-implemented method 900 can further include storing the scaled counter in the translation lookaside buffer in response to a translation lookaside buffer miss, or in a page table entry associated with the translation lookaside buffer upon a translation lookaside buffer eviction or a translation lookaside buffer writeback.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least storing access frequency data, measuring access frequency data and/or storing data, etc. are established from a combination of electrical and mechanical components and circuitry, a human is unable to replicate or perform a condition detection process associated with the hybrid memory component 102 (e.g., the access frequency component 104, the memory management component 106, the bit field component 202, and/or the counter component 302) disclosed herein. For example, a human is unable to store access frequency data, a human is unable to measure access frequency data, a human is unable to store data in storage class memory or volatile memory, etc.

Figure 10:
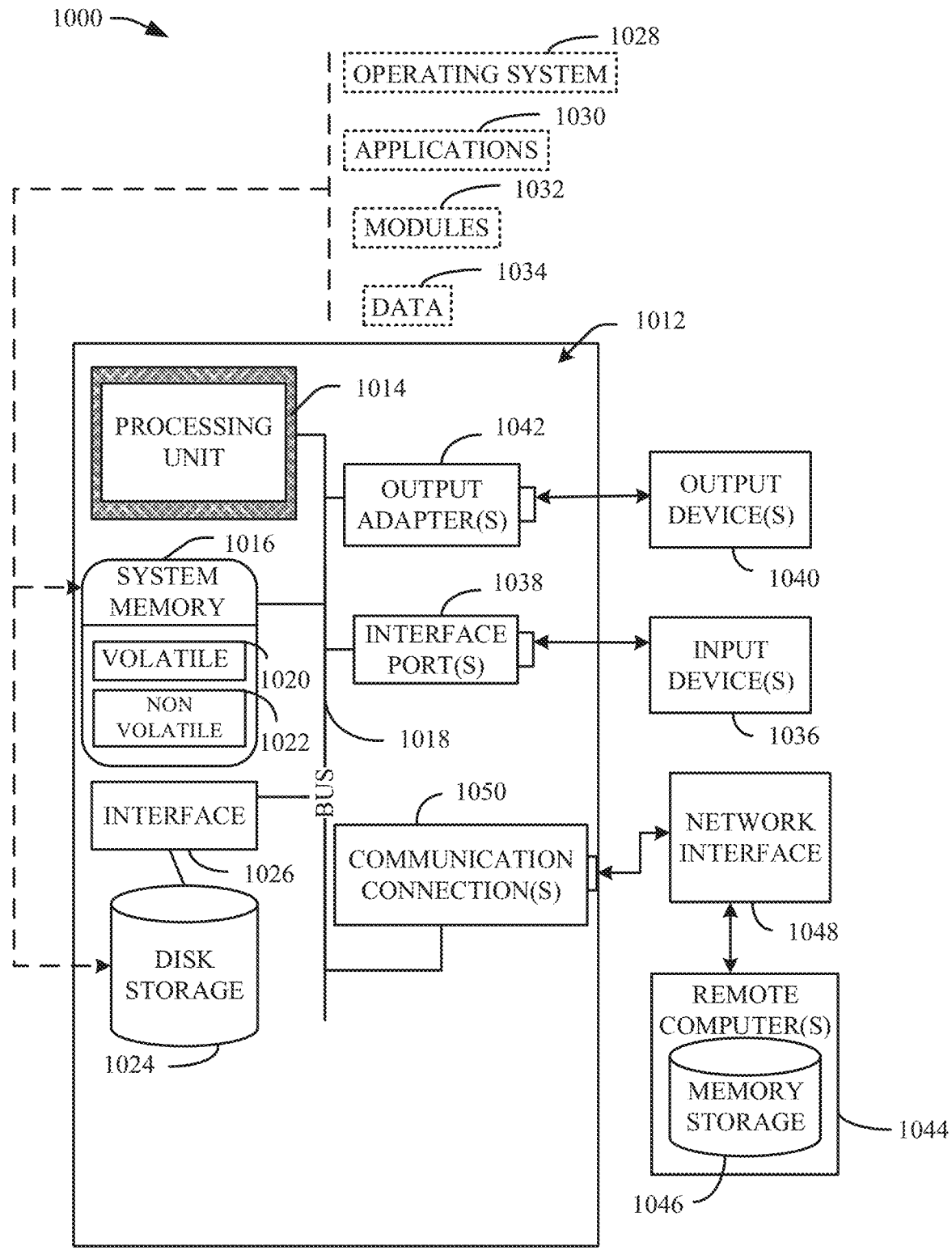
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, Matlab, Python, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components;
    a processor that executes the computer executable components stored in the memory, wherein the computer executable components comprise:
        an access frequency component that:
            generates a scaled counter representative of access frequency data for storage class memory and volatile memory, wherein the access frequency data indicates a frequency of access to the storage class memory and the volatile memory, and
            stores the scaled counter, comprising:
                in response to a miss occurring with a translation lookaside buffer, storing the scaled counter in the translation lookaside buffer, and
                in response to an event, selected from a group consisting of an eviction and a writeback, occurring with the translation lookaside buffer storing the scaled counter in a page table entry; and
        a memory management component that determines whether to store data in the storage class memory or the volatile memory based on the scaled counter.

2. The system of claim 1, wherein the scaled counter is scaled according to a quasi-logarithmic scale table.

3. The system of claim 1, wherein the access frequency data is based upon virtual memory manager translations associated with the storage class memory and the volatile memory.

4. The system of claim 1, wherein the access frequency component generates the access frequency data for utilization in a page replacement algorithm or a page placement algorithm.

5. The system of claim 1, wherein the memory management component stores the data in the storage class memory based on the scaled counter being below a defined threshold level.

6. The system of claim 1, wherein the memory management component stores the data in the storage class memory based on the scaled counter being above a defined threshold level.

7. The system of claim 1, wherein the memory management component determines whether to store the data in the storage class memory or the volatile memory to facilitate improved storage efficiency for the storage class memory and the volatile memory.

8. A computer-implemented method, comprising:
generating, by a system operatively coupled to a processor, a scaled counter representative of access frequency data for storage class memory and volatile memory, wherein the access frequency data indicates a frequency of access to the storage class memory and the volatile memory;
storing, by the system, the scaled counter, comprising:
in response to a miss occurring with a translation lookaside buffer, storing the scaled counter in the translation lookaside buffer, and
in response to an event, selected from a group consisting of an eviction and a writeback, occurring with the translation lookaside buffer storing the scaled counter in a page table entry;
receiving, by the system, data associated with a computing process; and
determining, by the system, whether to store the data in the storage class memory or the volatile memory based on the scaled counter.

9. The method of claim 8, wherein the scaled counter is scaled according to a quasi-logarithmic scale table.

10. The method of claim 8, further comprising:
storing, by the system, the data in the storage class memory based on the scaled counter not satisfying a defined criterion.

11. The method of claim 8, further comprising:
storing, by the system, the data in the storage class memory based on the scaled counter satisfying a defined criterion.

12. The method of claim 8, wherein the access frequency data is based upon virtual memory manager translations associated with the storage class memory and the volatile memory.

13. The method of claim 8, further comprising:
generating, by the system, the access frequency data for utilization in a page replacement algorithm or a page placement algorithm.

14. The method of claim 8, wherein the determining comprises improving storage efficiency for the storage class memory and the volatile memory.

15. A computer-implemented method, comprising:
generating, by a system operatively coupled to a processor, a scaled counter representative of access frequency data for storage class memory and volatile memory, wherein the access frequency data indicates a frequency of access to the storage class memory and the volatile memory;
storing, by the system, the the scaled counter, comprising:
in response to a miss occurring with a translation lookaside buffer, storing the scaled counter in the translation lookaside buffer, and
in response to an event, selected from a group consisting of an eviction and a writeback, occurring with the translation lookaside buffer storing the scaled counter in a page table entry; and
determining, by the system, whether to store data in the storage class memory or the volatile memory based on the scaled counter.

16. The method of claim 15, wherein the scaled counter is scaled according to a quasi-logarithmic scale table.

17. The method of claim 15, further comprising:
storing, by the system, one of the data in the storage class memory based on the scaled counter not satisfying a defined criterion.

18. The method of claim 15, further comprising:
storing, by the system, one of the respective data in the volatile memory based on the scaled counter satisfying a defined criterion.

19. The method of claim 15, wherein the access frequency data is based upon virtual memory manager translations associated with the storage class memory and the volatile memory.

20. The method of claim 15, further comprising:
generating, by the system, the access frequency data for utilization in a page replacement algorithm or a page placement algorithm.

* * * * *